No. 623,828. Patented Apr. 25, 1899.
H. RIENSCH.
APPARATUS FOR PURIFYING REFUSE WATER.
(Application filed May 19, 1897.)
(No Model.) 3 Sheets—Sheet 1.
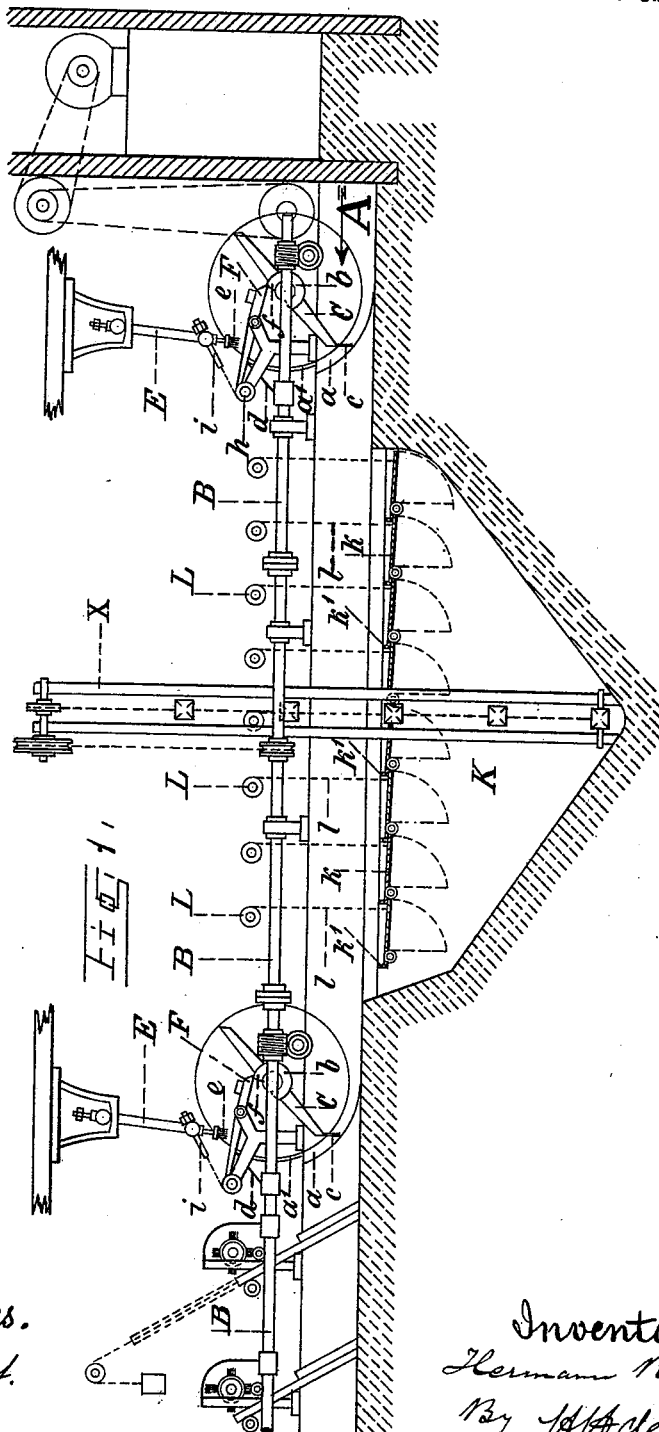

No. 623,828. Patented Apr. 25, 1899.
H. RIENSCH.
APPARATUS FOR PURIFYING REFUSE WATER.
(Application filed May 19, 1897.)
(No Model.) 3 Sheets—Sheet 2.
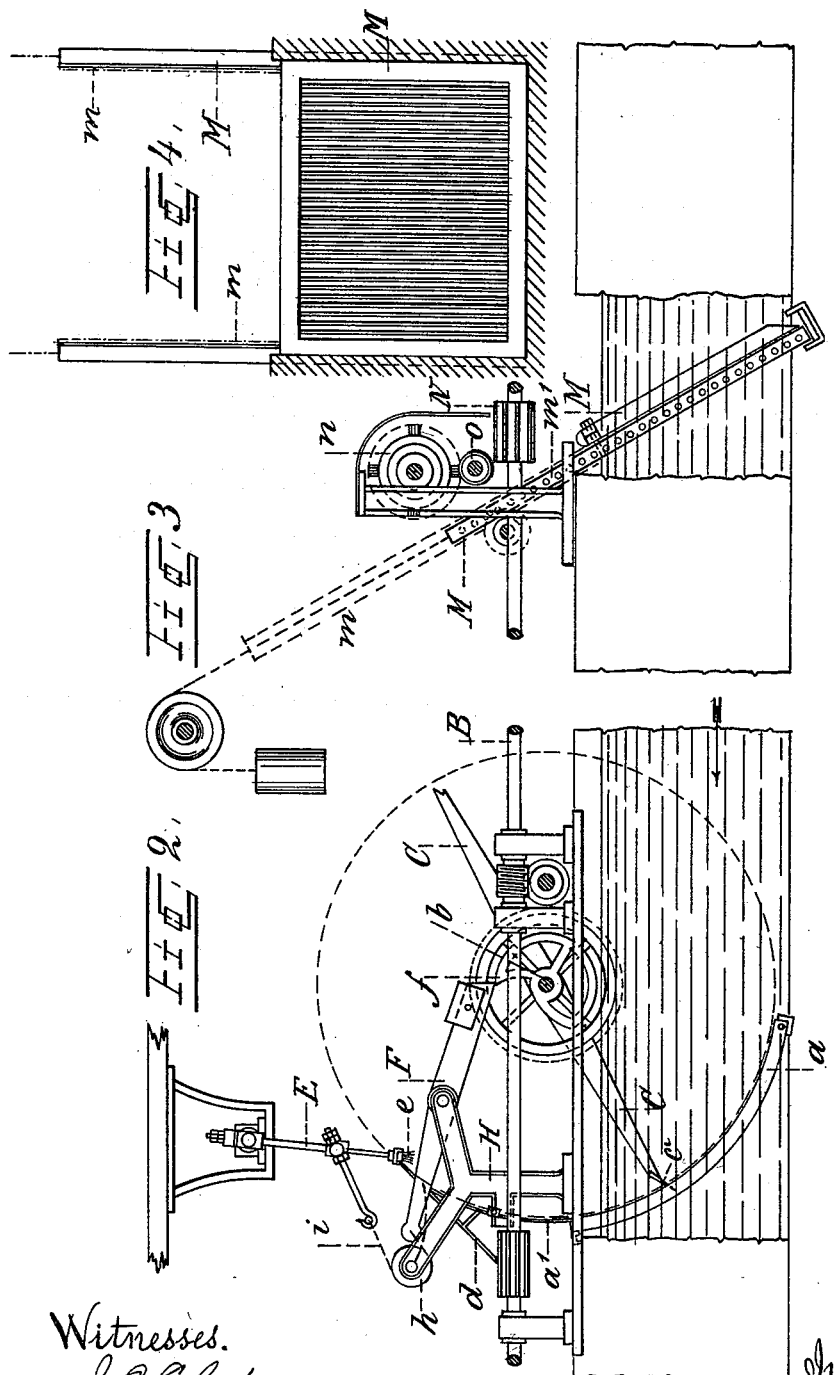
Witnesses.
J. Chebret
O. Block.
Inventor.
Hermann Riensch,
By H. A. de Vos.
Attorney.

No. 623,828. Patented Apr. 25, 1899.
H. RIENSCH.
APPARATUS FOR PURIFYING REFUSE WATER.
(Application filed May 19, 1897.)
(No Model.) 3 Sheets—Sheet 3.
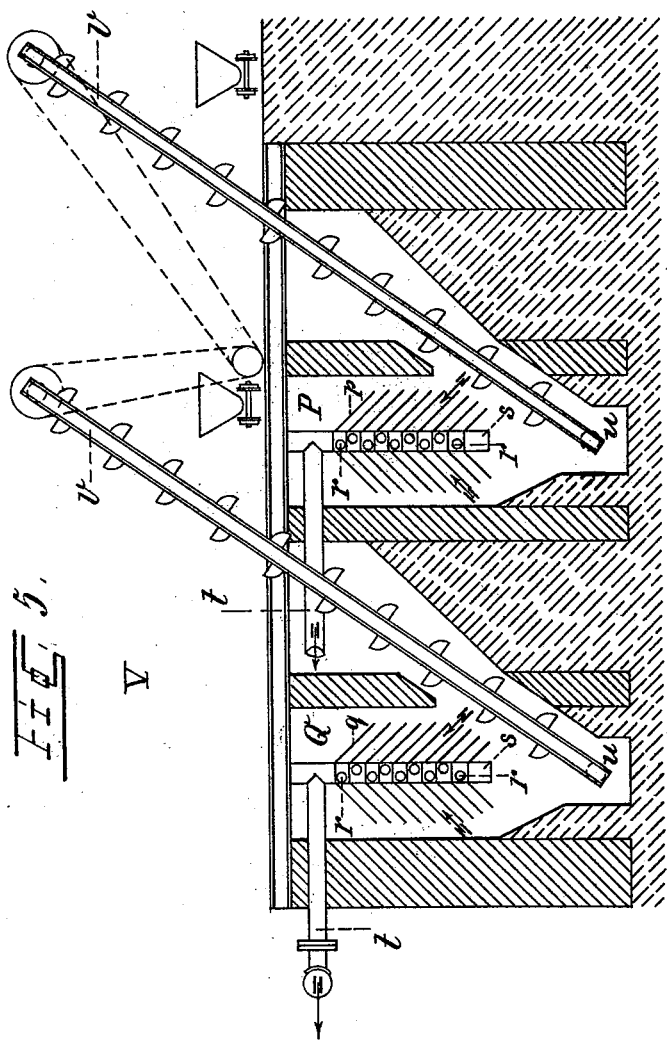

United States Patent Office.

HERMANN RIENSCH, OF WIESBADEN, GERMANY.

APPARATUS FOR PURIFYING REFUSE WATER.

SPECIFICATION forming part of Letters Patent No. 623,828, dated April 25, 1899.

Application filed May 19, 1897. Serial No. 637,191. (No model.)

*To all whom it may concern:*

Be it known that I, HERMANN RIENSCH, a subject of the German Emperor, residing at Wiesbaden, Germany, have invented a certain new and useful Plant for Purifying Refuse Water, of which the following is a specification.

My invention relates to a plant for purifying refuse water and collecting the matter obtained thereby and is based upon the principle of removing the matter contained in the water as soon and as rapidly as possible, so that the decomposition of such matter has not yet or only slightly set in. By such quick removal of the matter the obvious advantage obtained is that the chemical action of the impurities upon the water is still very slight and that they retain their value as a fertilizer. To attain this purpose, it is necessary that the purification of the water be effected as soon as it reaches the main sewer, and this is effected by the four or six following different steps: First, a mechanical cleaning of the refuse water from all coarse bodies up to about fifteen millimeters in size, coupled with an easily-effected separation of all matter that may advantageously be used for another purpose—as, for instance, rags, paper, candle-pieces, soap, cork, wood, &c.—the separation of these bodies being likewise effected for the purpose of preventing them from becoming prejudicial to the separation of the remaining matter, which is principally formed into fertilizer during the following operations; second, the purification of the water from sand and the cleaning of this sand; third, the separation of all tangible bodies up to a size of four to six millimeters; fourth, the separation of all remaining floating bodies. These four steps answer the purpose in many instances. If, however, a higher degree of purity is desired, recourse may be had to a chemical cleaning of the water.

In my invention of purifying the refuse water any collection of this water in large basins is avoided, because the water is purified as it arrives in the plant. Consequently the decomposition of the impurities in the water is stopped when the water reaches the cleaning-plant, and I hereby obtain the following advantages: First, the cleaning of the water is much easier, because the impurities are removed in concentrated form; second, the separated matter has a higher fertilizing value, as a considerable quantity of manure matter is lost by the decomposition; third, the process can be carried out in a very limited space and at any desired place without giving cause for complaint; fourth, the gradual operations as embodied in my invention are performed automatically by machines, one machine relieving the other.

The mechanical means used for carrying my invention into practice are illustrated in the annexed drawings, making a part of this specification, and wherein—

Figure 1 shows a plant for the mechanical purification of refuse water. Figs. 2, 3, and 4 show the several mechanical means on a larger scale. Fig. 5 shows a chemical mechanical cleaning device which is used in connection with the plant illustrated in Fig. 1 if the mechanically-cleaned water should still require a chemical clearing.

In the first step of my method all bodies larger than fifteen millimeters are removed from the water. The means used for this purpose are illustrated in Figs. 1 and 2. In the sewer A the curved grate $a$ is placed so that the water flowing through the sewer in the direction of the arrow must pass through the grate. The bars of this grate are at a distance of fifteen millimeters from each other and they are not connected by cross-bars running the full width of the sewer, but each couple of bars is kept together by connecting-pieces. They are loosely placed in the sewer one beside the other and then assembled by suitable set-screws. I thus obtain a solid grate, the bars resting at both ends in suitable supports, while if necessary the bars may be readily removed and replaced. Before the grate $a$ is arranged the rotary shaft $b$, with double arms C C and comb $c$, the elastic teeth engaging in the grate-openings. The shaft derives its rotary motion from the shaft B, common to all devices, preferably by means of a worm-gear, as shown, so that the teeth of the comb $c$ passing between the grate-openings move all matter retained there upward. At the upper end of the grate is arranged a hinged shell $a'$, forming an extension of the grate and adapted to enable the combs $c$ to raise the matter sufficiently for its further conveyance. A discharge-table $d$ is riveted to this shell $a'$, and when the comb $c$ has reached the end of the shell the adhering matter is removed by means of a brush $e$, connected to a pendulum E. This pendulum is set in motion by the shaft $b$ by means of the eccentric $f$, the weighted lever F and the chain $i$ passing over the roller $h$, arranged in the support H. If through any cause this pendulum should not operate, the comb will raise the brush and pendulum, same being loosely suspended, as shown in the drawings. As soon as the comb releases the brush $e$ it will by its own weight drop again into operative position. The matter brought up by the comb is deposited upon the inclined table $d$, and thus slides on an endless continuously-moving belt. Articles, as rags, paper, soap, cork, &c., are removed by hand and thrown into baskets, the rest being automatically removed into a car or similar device for further conveyance. The water is thus released of the coarse objects and passed through the grate $a$, charged with all further impurities of a size less than fifteen millimeters. Among these impurities sand is found in rather considerable quantity, and this sand is removed in the second operation. This step is based upon the following principle, the correctness of which has been demonstrated by experiments: The particles of sand carried along by the water have a tendency to collect on the bottom, if same is slightly lower than the normal bottom of the sewer, rather than in a so-called "sand-trap" of considerable depth interposed in the sewer. In the latter case the particles of sand remain floating longer, are carried forward by the current of water, and settle more on the bottom of the sewer behind than in the sand-trap. The channel A, behind the grate $a$, is continued in straight line and of uniform dimension. The water flows slowly through the channel, so that the sand can settle. At this place the bottom of the channel is formed by hinged metal plates $k$, (eight of these plates being shown in Fig. 1,) the ends of these plates overlapping each other, as shown. At one end of each of these plates is arranged a cross-rail $k'$ of about five to ten centimeters in height, and the whole length of the bottom formed by the series of plates is about ten centimeters below the normal bottom of the channel, so that the sand, which is, moreover, retained by the cross-rails $k'$, will settle upon these plates. Underneath these plates $k$ is the receptacle K, made of brickwork, the walls of which incline toward each other in funnel shape. The sand settles upon the plates $k$, as explained, and as same are arranged slightly below the bottom of the channel the water will flow continuously over the several layers of sand and wash it. From time to time the plates $k$ are tilted one after the other by means of the chains $l$, passed over the pulleys L, and again raised into position after the sand settled on the plate has dropped into the receptacle K. The sand is removed from the pit K by a suitable dredge X.

In the third step the water already released from the coarse objects and sand is freed from the bodies larger than five to six millimeters. The apparatus employed for this purpose is essentially similar to the one used for the first operation; but the bars of the grate are formed so as to present passages from five to six millimeters at the front, but widening to about ten millimeters at the back of the bars in order to prevent a clogging up of the passages. In this device the comb $c$ is not formed, as in No. 1, of separate teeth, but of sheets of steel equipped with saw-like teeth, each tooth being set so as to increase its strength. This device can be allowed to operate without any attendance.

The fourth step under my invention is of special importance and requires some explanatory remarks. Hitherto the fine bodies floating in the refuse water were allowed to remain therein, in the first place, because in large quantities of water their removal by mechanical means was not practicable, and in the second place because in case the water was submitted to a subsequent chemical cleaning these bodies were considered to provide additional means for forming the sediment after the precipitating medium had been brought into the water in so far as these bodies will settle with the sediment formed by the precipitating medium, and thus enhance the sediment, which was supposed thus to carry along the finest matter. Repeated experiments have shown this theory to be not correct. The swimming objects do not constitute precipitating means, but they require a medium in order to be precipitated. With such medium they will of course settle quicker than the finer matter because they are heavier; but they do not carry such finer matter along, as was generally assumed, but leave same for the greater part floating. As to bodies of grease, even a precipitating medium will not cause them to settle. It is therefore reasonable to assume that as far as possible all tangible bodies should be removed by mechanical purification. These fine bodies should, however, be caused to cooperate in a different way—i. e., by using them as filters for the absorption of still finer matter.

In order to effect a purification as specified, special arrangements are required with very fine passages, whereby the great danger of clogging is avoided, so that the continuous operation be not interrupted under any circumstances. All experiments made with sieves or perforated sheets, either of straight surface or of drum form, have not yielded satisfactory results. The meshes and perforations become clogged up very soon. The cleaning is very difficult, even flooding with water under pressure being not adequate.

With the apparatus which I am now proceeding to describe very fine results have been obtained.

The apparatus consists of two or more light wrought-iron frames M, Figs. 1, 3, and 4, corresponding in height and width to the dimensions of the sewer. The frames are equipped with metal wires in the manner of a harp, and in this way passages of one millimeter, or, if necessary, still smaller, are obtained. In order to obtain a uniform good tension of the wires, each couple of wires is tightened by a tension-screw. The whole surface presented to the refuse water is perfectly smooth, free, and straight, and can therefore be easily cleaned. The two frames are placed in the sewer in guide-rails $m$, Fig. 1, at a distance of about one meter and oblique to the current of the water. The dirt in the water will settle before the wires, and thus forms a filter-layer that will retain the finest floating bodies. If the layer has become so thick and compact that the normal passage of water becomes obstructed, the foremost frame is raised by throwing into gear a mechanical hoisting device. For this purpose the frame is equipped at both sides with a rack $m'$. During its upward movement the frame is cleansed by the circular brush $n$ and the dirt is thrown on the endless apron N. The slowly-rotating roll $o$, also cleaned by the brush, closes the space between the frame and the endless apron N. As soon as the frame is moved to its highest point it remains stationary. By reversing the counterweighted gear the frame is then gradually lowered on its inclined guide into the sewer and is once more cleaned by the brush $n$ during this downward movement. During the time that one of the frames is raised the other one will remain operative and catch the fine matter and filter the water. It is remarked that the circular brush $n$ of each frame is only operative during the raising and lowering of the corresponding frame. During the balance of time it rotates freely. During this time it will clean itself automatically, and in this way the bristles remain dry and stiff. By means of this apparatus the mechanical purification of the water can be brought to a high degree of perfection, especially by increasing the number of frames or by making the passages between the wires still narrower. This mechanical purification is effected in a few minutes and does not take more time than required by the refuse water for passing through the apparatus without decreasing its speed.

If the purification of the refuse water is effected soon after its formation and if no injurious chemical refuse is contained in the water, the mechanical purification hereinbefore described will be entirely sufficient and the water may be safely admitted into the open streams. If, however, this is not the case, the water is submitted to a chemical mechanical purification.

Precipitating means are added to the mechanically-purified water before it is admitted into the tanks P and Q, in which are located the purifying devices $p$ and $q$. These devices $p$ and $q$ consist of a central hollow stem $s$, closed at the bottom and around which are arranged a series of umbrella-shaped plates, as shown. Between the places of contact of these umbrella-shaped plates and the central stem are provided holes $r$, as shown. The water will now rise between these plates and finds no other exit than the holes $r$. The sediment will thereby settle on the plates, and when this sediment has obtained a certain weight it will slide down the plate and drop into the mud-receptacle $u$, provided at the bottom of each basin. The purified water enters into the central stem $s$ and flows off through the pipes $t$. The sediment collected in the receptacles $u$ is continuously removed by dredges $v$ and dropped into suitable cars provided for this purpose. The character of the further precipitating preparations to be used depends upon the nature of the refuse water.

In Fig. 1 of the drawings the numerals 2 and 3 designate belts transmitting motion from a pulley 3 through shafts 4 5 6 and pulleys 7 and 8 to the shaft B. As these features, however, constitute no part of the invention and may be substituted by other means for transmitting motion to the shaft B, it is not necessary to more fully illustrate and describe the same.

Having now described my invention, what I claim, and desire to secure by Letters Patent, is—

1. A plant for purifying refuse water comprising a channel or way for the water to flow through; a screen located in said channel to intercept larger particles or bodies of refuse matter, means for removing the foreign matter from said screen, hinged plates or members located in said channel to the rear of said screen and lying slightly below the bottom of said channel to receive sand deposited from the water in passing over said plates or members, a receptacle below said plates or members to receive the sand discharged therefrom, a second screen located in said channel to the rear of said plates or members and of smaller mesh than the first-mentioned screen to intercept smaller particles or bodies of refuse matter carried by the flowing water, means for removing the intercepted matter from said screen, a plurality of movable inclined screens arranged in said channel to the rear of said second-mentioned screen, means for raising and lowering said inclined screens, means for removing intercepted matter from the inclined screens while the latter are being raised and lowered, and tanks or receptacles to receive the water from said way or channel, substantially as and for the purposes described.

2. In a plant for purifying refuse water, the combination with the sewer or way for the water, of a grate located in the sewer or way in an inclined position, a comb rotating in said sewer or way in the direction of the passage of water through the sewer or way so as to lift the refuse matter intercepted by said grate, and an endless blanket arranged adjacent to the upper end of said grate so as to receive and carry off the refuse matter discharged by said rotating comb, substantially as and for the purposes described.

3. In a plant for purifying refuse water, the combination with the sewer or way for the water, of a grate located in said sewer or way to intercept refuse matter, a rotary comb for clearing said grate of the refuse matter intercepted by it, and a swinging brush located above the grate and arranged to clean said comb as the same rotates, substantially as and for the purposes described.

4. In a plant for purifying refuse water, the combination with the sewer or way for the water, of a receptacle located below the sewer or way, and a series of swinging plates or members arranged between said receptacle and the bottom of the sewer or way and adapted when closed to lie substantially in a horizontal plane slightly below the bottom of the sewer or way to form a trap to receive sand deposited from the water and hold the same so as to be washed by the water flowing over said plates or members, substantially as and for the purposes described.

5. In a plant for purifying refuse water, the combination with the sewer or way for the water, of an inclined screen located in said sewer or way, said screen consisting of a frame provided with strings or wires, guideways in which said frame may be moved up and down, means for raising and lowering said frame, and a rotary brush located to contact with said screen as the same is raised and lowered so as to remove foreign matter from said screen, substantially as and for the purposes described.

In witness whereof I have hereunto set my hand in presence of two witnesses.

HERMANN RIENSCH.

Witnesses:
DEAN B. MASON,
FRANK H. MASON.